United States Patent [19]

Hillman

[11] 4,357,444

[45] Nov. 2, 1982

[54] METHOD FOR MECHANICALLY SUBDIVIDING RUBBERY, TACKY POLYMER

[75] Inventor: Patrick E. Hillman, Corpus Christi, Tex.

[73] Assignee: PPG Industries, Inc., Pittsburgh, Pa.

[21] Appl. No.: 320,982

[22] Filed: Nov. 12, 1981

[51] Int. Cl.³ .......................... C08L 7/00; C08L 9/00
[52] U.S. Cl. ...................................... 525/232; 525/76; 525/83; 525/96; 525/198; 525/215; 525/235; 525/236
[58] Field of Search ................. 525/232, 235, 236, 76, 525/83, 96, 198, 215

[56] References Cited

U.S. PATENT DOCUMENTS 2,980,656  4/1961  Jones et al. ........................ 260/85.1
3,293,226  12/1966  De Schrijver ..................... 260/85.1
3,392,161  7/1968  Uelzmann ........................... 260/94.7
3,798,291  3/1974  Dall'Asta et al. ................... 260/931
3,943,192  3/1976  Coulthard ........................... 525/215

OTHER PUBLICATIONS

S. Crawley and I. C. McNeill, "Preparation and Degredation of Head-to-Head PVC", *Journal of Polymer Science*, vol. 16, pp. 2593–2606 (1978).

N. Murayama and Y. Amagi, "On Head-to-Head Poly(vinyl chloride) and Poly(vinylidene chloride)", *Polymer Letters*, vol. 4, pp. 119–125 (1966).

*Primary Examiner*—J. Ziegler
*Attorney, Agent, or Firm*—George D. Morris

[57] ABSTRACT

Rubbery, tacky polymer is mechanically subdivided in the presence of fine particles of substantially thermoplastic halogenated polymer.

15 Claims, No Drawings

METHOD FOR MECHANICALLY SUBDIVIDING RUBBERY, TACKY POLYMER

It is often desired to mechanically subdivide pieces of rubbery, tacky polymer prior to further processing or use, as for example, prior to dissolving in solvent. One of the problems associated with such subdivision is that due to the tacky nature of the polymer, the subdivided pieces stick together upon contact. The problem is especially aggravated when the polymer also exhibits a significant degree of "cold flow", that is, flow at room temperature characteristic of a highly viscous liquid. When both high tack and a significant degree of cold flow are characteristics of the polymer, not only will the subdivided pieces stick together, but after a period of time they will coalesce into a larger mass.

The present invention serves to alleviate the above problem by coating the subdivided pieces substantially as they are formed with fine particles of substantially thermoplastic halogenated polymer. Accordingly, in the method wherein rubbery, tacky polymer is mechanically subdivided, the invention is the improvement comprising conducting the mechanical subdivision in the presence of fine particles of substantially thermoplastic halogenated polymer.

The rubbery, tacky polymer is usually substantially thermoplastic and may be homopolymer, interpolymer, block polymer, graft polymer or a mixture of polymers. Examples of rubbery, tacky polymers which may be used in the practice of the invention include rubbery tacky butadiene polymer, rubbery tacky isoprene polymer and rubbery tacky natural rubber.

The preferred rubbery tacky polymer is polybutadiene. It is especially preferred that such polybutadiene have at least about 90 mole percent cis-1,4-configuration. Often such high-cis polybutadiene has at least about 95 mole percent cis-1,4-configuration, and sometimes it has at least about 99 mole percent cis-1,4-configuration.

The weight average molecular weight of the rubbery, tacky polymer is subject to wide variation, but it is usually in the range of from about 25,000 to about 1,000,000. Often the weight average molecular weight is in the range of from about 40,000 to about 800,000. It is preferred that the weight average molecular weight be in the range of from about 200,000 to about 500,000.

The substantially thermoplastic halogenated polymer may similarly be homopolymer, interpolymer, block polymer, graft polymer or a mixture of polymers. Examples of substantially thermoplastic halogenated polymers which may be employed include substantially thermoplastic halogenated butadiene polymer, substantially thermoplastic halogenated isoprene polymer and substantially thermoplastic halogenated natural rubber. Of particular importance is substantially thermoplastic halogenated butadiene polymer.

The preferred substantially thermoplastic halogenated polymer is substantially thermoplastic halogenated polybutadiene. Substantially thermoplastic chlorinated polybutadiene is particularly preferred.

The preparation of substantially thermoplastic halogenated butadiene polymer, and especially of substantially thermoplastic halogenated polybutadiene, is described in U.S. Pat. Nos. 2,980,656; 3,293,226 and 3,392,161 and in United States Patent Application Ser. No. 320,983 pending, filed Nov. 12, 1981, the entire disclosures of which are incorporated herein by reference. It is preferred that the substantially thermoplastic halogenated polybutadiene be prepared by reacting polybutadiene having at least about 90 mole percent cis-1,4-configuration with chlorine, bromine or a mixture thereof. Often the polybutadiene starting material has at least about 95 mole percent cis-1,4-configuration and sometimes it has at least about 99 mole percent cis-1,4-configuration. The preferred halogenation agent is chlorine.

The substantially thermoplastic halogenated polymer is not significantly crosslinked and is soluble in such solvents as benzene, acetone and dioxane. The solubility index is the percent of light transmitted by a one weight percent solution of the polymer in cyclohexanone relative to the light transmitted by pure cyclohexanone. A polymer solution having the same light transmission as pure cyclohexanone would therefore have a solubility index of 100. A Perkin Elmer Model 554 spectrophotometer using one centimeter cells and light with a wavelength of 600 nanometers is used in making these measurements. The solubility index is a measure of crosslinking; low values indicate crosslinking of the product leading to insolubility, whereas high values are indicative of low degrees of crosslinking. The substantially thermoplastic halogenated polymers employed in the present invention ordinarily have solubility indices of at least about 50. The solubility index is often at least about 80 and preferably it is at least about 90.

The halogen content of the substantially thermoplastic halogenated polymer can vary widely, but it is usually in the range of from about 5 percent to about 80 percent by weight of the polymer. Typically the halogen content is in the range of from about 40 percent to about 70 percent by weight. A halogen content in the range of from about 50 percent to about 65 percent by weight is preferred, especially when the halogen is chlorine.

The earlier discussion of weight average molecular weight is also generally applicable to the substantially thermoplastic halogenated polymer.

The sizes of the fine particles of substantially thermoplastic halogenated polymer used in the invention may vary widely; however, they should not on the whole be so large that their function of reducing sticking together of subdivided rubbery tacky, polymer is seriously impaired. Generally the particle sizes are about 0.25 millimeter or smaller, although the additional presence of larger particles is generally not harmful. Often the particle sizes are in the range of from about 0.01 millimeter to about 0.2 millimeter. From about 0.07 millimeter to about 0.15 millimeter is preferred. The fine particles may be substantially uniformly sized, but most often they are a mixture of various sizes.

The weight ratio of the fine particles to the rubbery, tacky polymer is also susceptible to considerable variation. Usually, however, the weight ratio is in the range of from about 0.001:1 to about 1:1. Typically the weight ratio is in the range of from about 0.005:1 to about 0.4:1. A weight ratio in the range of from about 0.05:1 to about 0.2:1 is preferred.

Examples of various techniques of mechanical subdivision that may be used include cutting, shaving and chipping. The preferred technique, however, is cutting. Tthe use of rotary knife cutters is particularly preferred.

Although the present invention may be used to provide subdivided rubbery, tacky polymer for any of a wide variety of purposes, it is especially usefully employed prior to dissolving the rubbery, tacky polymer in solvent.

In many applications it is advantageous for the polymer which is halogenated to form the substantially thermoplastic halogenated polymer, to be substantially the same as the rubbery, tacky polymer which is mechanically subdivided according to the invention. In one such application, polybutadiene having at least about 90 mole percent cis-1,4-configuration is mechanically subdivided according to the present invention in the presence of substantially thermoplastic chlorinated polybutadiene. The subdivided polybutadiene is then dissolved in solvent and reacted with chlorine to produce substantially thermoplastic chlorinated polybutadiene. The fine particles of substantially thermoplastic chlorinated polybutadiene used in the subdivision process of this invention is not a contaminant in the product of the overall process because they are substantially the same. A portion of the product may then be recycled for use in the subdivision process. The preferred halogenation process is described in detail in United States Application Ser. No. 320,983, filed Nov. 12, 1981.

EXAMPLE

Seventy grams of large pieces of rubbery, tacky polybutadiene were mechanically subdivided into much smaller pieces in the presence of 7 grams of particles of substantially thermoplastic chlorinated polybutadiene having sizes in the range of from 0.074 millimeter to 0.149 millimeter (100 mesh to 200 mesh, U.S. Sieve Series) using a Waring Model 11-394 household blender.

A 3 liter, 4-necked flask equipped with an agitator was charged with 2500 cubic centimeters of solvent consisting essentially of 20 volumetric parts of methylene chloride and 80 volumetric parts carbon tetrachloride. The contents of the Waring blender were added to the solvent with agitation. The time needed for dissolving all of the mechanically subdivided polybutadiene was less than one hour at room temperature.

Although the present invention has been described with reference to specific details of certain embodiments thereof, it is not intended that such details should be regarded as limitations upon the scope of the invention except insofar as they are included in the accompanying claims.

I claim:

1. In the method wherein rubbery, tacky polymer is mechanically subdivided, the improvement comprising conducting the mechanical subdivision in the presence of fine particles of substantially thermoplastic halogenated polymer.

2. The method of claim 1 wherein said substantially thermoplastic halogenated polymer has a solubility index of at least about 50.

3. The method of claim 1 wherein said fine particles have sizes of about 0.25 millimeter or smaller.

4. The method of claim 1 wherein the weight ratio of said fine particles to said rubbery, tacky polymer is in the range of from about 0.00:1 to about 1:1.

5. The method of claim 1 wherein said mechanical subdivision is accomplished by cutting.

6. The method of claim 1 wherein said rubbery, tacky polymer is rubbery tacky butadiene polymer, rubbery tacky isoprene polymer or rubbery tacky natural rubber.

7. The method of claim 6 wherein said substantially thermoplastic halogenated polymer is substantially thermoplastic halogenated butadiene polymer, substantially thermoplastic halogenated isoprene polymer or substantially thermoplastic halogenated natural rubber.

8. The method of claim 1 wherein said rubbery, tacky polymer is polybutadiene.

9. The method of claim 8 wherein said polybutadiene has at least about 90 mole percent cis-1,4-configuration.

10. The method of claim 9 wherein said substantially thermoplastic halogenated polymer is substantially thermoplastic halogenated polybutadiene.

11. The method of claim 10 wherein said substantially thermoplastic halogenated polybutadiene has been prepared by reacting polybutadiene having at least about 90 mole percent cis-1,4-configuration with chlorine, bromine or a mixture thereof.

12. The method of claim 9 wherein said substantially thermoplastic halogenated polymer is substantially thermoplastic chlorinated polybutadiene.

13. The method of claim 12 wherein said substantially thermoplastic chlorinated polybutadiene has been prepared by reacting polybutadiene having at least about 90 mole percent cis-1,4-configuration with chlorine.

14. The method of claim 13 wherein the weight ratio of said fine particles to said rubbery, tacky polymer is in the range of from about 0.05:1 to about 0.2:1.

15. The method of claim 14 wherein said fine particles have sizes of about 0.25 millimeter or smaller.

* * * * *

UNITED STATES PATENT AND TRADEMARK OFFICE
CERTIFICATE OF CORRECTION

PATENT NO. : 4,357,444

DATED : November 2, 1982

INVENTOR(S) : Patrick E. Hillman

It is certified that error appears in the above–identified patent and that said Letters Patent are hereby corrected as shown below:

Column 4, line 13, "0.00:1" should be --0.001:1--.

Signed and Sealed this

First Day of March 1983

[SEAL]

Attest:

GERALD J. MOSSINGHOFF

Attesting Officer     Commissioner of Patents and Trademarks